(12) United States Patent
Lin et al.

(10) Patent No.: US 8,149,228 B2
(45) Date of Patent: Apr. 3, 2012

(54) ACTIVE MATRIX SUBSTRATE

(75) Inventors: Hsiang-Lin Lin, Changhua County (TW); Ching-Huan Lin, Tainan County (TW); Kuo-Yu Huang, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 1071 days.

(21) Appl. No.: 11/308,644

(22) Filed: Apr. 17, 2006

(65) Prior Publication Data
US 2007/0070093 A1    Mar. 29, 2007

(30) Foreign Application Priority Data
Sep. 29, 2005    (TW) .............................. 94133945 A

(51) Int. Cl.
*G06F 3/033*    (2006.01)
(52) U.S. Cl. .............................. 345/204; 345/98; 345/99
(58) Field of Classification Search .................. 345/204, 345/694, 98, 99, 149
See application file for complete search history.

(56) References Cited

U.S. PATENT DOCUMENTS

| | | | |
|---|---|---|---|
| 5,144,288 A | 9/1992 | Hamada et al. ............... 349/109 |
| 5,235,447 A | 8/1993 | Hepp et al. ..................... 349/109 |
| 5,311,337 A | 5/1994 | McCartney, Jr. ............... 349/145 |
| 5,641,974 A | 6/1997 | den Boer et al. ................ 257/59 |
| 6,172,729 B1* | 1/2001 | Ikeda ............................. 349/145 |
| 6,771,345 B2 | 8/2004 | Liu et al. ....................... 349/146 |
| 2004/0036815 A1 | 2/2004 | Kim et al. ....................... 349/38 |
| 2005/0099377 A1* | 5/2005 | Kim ................................ 345/98 |
| 2005/0099378 A1* | 5/2005 | Kim ................................ 345/99 |

\* cited by examiner

*Primary Examiner* — Amare Mengistu
*Assistant Examiner* — Joseph G Rodriguez
(74) *Attorney, Agent, or Firm* — Jianq Chyun IP Office

(57) ABSTRACT

An active matrix substrate including a substrate, a plurality of scan lines, a plurality of data lines and a plurality of sub-pixels is provided. The scan lines and the data lines are disposed on the substrate, and define a plurality of sub-pixel regions distributed in a delta arrangement. The sub-pixels corresponding to the sub-pixel regions are disposed on the substrate. The sub-pixels are electrically connected with corresponding scan lines and corresponding data lines. Between two sub-pixel regions corresponding to any two adjacent sub-pixels at a same side of one scan line, there are two data lines. Each sub-pixel includes an active device and a pixel electrode. The active device is electrically connected with a corresponding scan line and a corresponding data line. The pixel electrode is electrically connected with the active device, and extends from the sub-pixel region corresponding to the sub-pixel to a position over the data line.

21 Claims, 15 Drawing Sheets

US 8,149,228 B2

ACTIVE MATRIX SUBSTRATE

CROSS-REFERENCE TO RELATED APPLICATION

This application claims the priority benefit of Taiwan application serial no. 94133945, filed on Sep. 29, 2005. All disclosure of the Taiwan application is incorporated herein by reference.

BACKGROUND OF THE INVENTION

1. Field of the Invention

The present invention relates to an active matrix substrate, and particularly to an active matrix substrate adapted for improving display quality of a liquid crystal display (LCD) using the same.

2. Description of Related Art

In order to satisfy the modern living, video and image devices are developing towards smaller sizes. Although conventional cathode ray tube (CRT) displays still have some advantages, with respect to the structures of their internal electron cavities, they are too bulky and occupy too much space. They even generate radiation which is harmful to eyes when displaying images. Therefore, flat panel displays such as LCDs, incorporating with new optoelectronic developments and semiconductor fabricating technologies, have gradually become mainstream display products.

FIG. 1A is a top view of a conventional thin film transistor (TFT) array substrate, and FIG. 1B is a schematic cross-sectional view along line a-b of the TFT array substrate shown in FIG. 1A. Referring to FIGS. 1A and 1B, the conventional TFT array substrate 100 includes a glass substrate 110, a plurality of scan lines 120, a plurality of data lines 130 and a plurality of sub-pixels 140. The scan lines 120, the data lines 130 and the sub-pixels 140 are all disposed on the substrate 110. The sub-pixels 140 are electrically connected with corresponding scan lines 120 and data lines 130. Each sub-pixel 140 includes a TFT 142 and a transmissive conductive electrode, such as indium tin oxide (ITO) electrode 144. The TFTs 142 are electrically connected with corresponding scan lines 120 and data lines 130, and the transmissive conductive electrode 144 is electrically connected with the TFT 142.

It is to be noted that, after the TFT array substrate 100 is assembled with a color filter substrate (not shown) and an LCD panel (not shown) is configured by filling a liquid crystal therein, any three adjacent sub-pixels 140 of each row of the TFT array substrate 100 respectively correspond in sequence to color filtering films for different colors on the color filter substrate. For example, the three adjacent sub-pixels 140 correspond in sequence to color filtering films for red color R, green color G, and blue color B. While the LCD panel is displaying, light passes through the liquid crystal layer first, and then passes through different color filtering films, respectively, so as to obtain red light, green light and blue light, all of which are combined to display different colors for viewers.

In a typical conventional LCD panel, the color filtering films (not shown) corresponding to the sub-pixels 140 are often distributed in strip arrangement. As shown in FIG. 1A, such arrangement often results in lower spatial resolution in horizontal direction. Sub-pixels 140 of a same column (in vertical direction) correspond to color filtering films of a same color, and sub-pixels 140 of a same row (in horizontal direction) correspond to color filtering films of three different colors, such as red, green and blue. Therefore, the sub-pixels 140 of a same row are periodically distributed with a period of the distance of three sub-pixels 140, thus more stripes may likely occur. Furthermore, as human eyes are less sensitive to blue color, thus a full white image may seem relatively dark, in that columns of blue sub-pixels 140 are arranged in series.

FIG. 2A is a top view of a conventional TFT array substrate, and FIG. 2B is a schematic cross-sectional view along line a-b of the TFT array substrate shown in FIG. 2A. Referring to FIGS. 2A and 2B, a better display quality can be obtained if sub-pixels 240 corresponding to color filtering films of respectively red color R, green color G and blue color B are distributed in delta arrangement as shown in FIG. 2A. However, such arrangement requires the corresponding TFTs 242 to be rearranged accordingly. Therefore, an original simple driving method, in which each data lines 130 controls sub-pixels 140 for displaying a single color as shown in FIG. 1A, has to be altered into a complicated one, in which each data line 230 controls sub-pixels 240 for displaying two colors as shown in FIG. 2A.

Moreover, parasitic capacitance $C_{pd}$ caused between the transmissive conductive electrodes 244 and the data lines 230 also has to be considered. The parasitic capacitance $C_{pd}$ increases as the transmissive conductive electrodes 244 are too close to the data lines 230, thus the displaying of the pixels will be interfered and cross-talk may occur when signals applied to the data lines 230 change. A dielectric layer (not shown) having a relative low dielectric constant employed between the data lines 230 and the transmissive conductive electrodes 244 may reduce the parasitic capacitance $C_{pd}$. Such a dielectric layer can be made of inorganic materials, organic materials or color filtering films, which can increase the aperture ratio by overlaying the transmissive conductive electrodes 244 onto the data lines 230. FIG. 2C schematically illustrates the capacitance effect of a single sub-pixel of FIG. 2A. Referring to FIG. 2C, a parasitic capacitance $C_{pd}'$ is generated between the transmissive conductive electrode 244 of a sub-pixel 240; and a data line 230 (the $(n-1)^{th}$ data line) disposed at its left side, and a parasitic capacitance $C_{pd}$ is generated between the transmissive conductive electrode 244 of a sub-pixel 240 and a data line 230 (the $n^{th}$ data line) disposed at its right side. The total parasitic capacitance between the transmissive conductive electrode 244 and the data lines 230 is a sum of $C_{pd}'$ and $C_{pd}$. When an LCD panel including the TFT array substrate shown in FIG. 2A is driven by a dot inversion or a column inversion driving method, which means that the voltage differences of the $n^{th}$ data line and the common lines are positive (or negative), while the voltage differences of the $(n-1)^{th}$ data line and the common lines are negative (or positive) when a scan line be turned on. Therefore, the total parasitic capacitance $(C_{pd}'+C_{pd})$ can be reduced by cancellation of the parasitic capacitances $C_{pd}'$ and $C_{pd}$.

During fabrication of LCD panels with high aperture ratio, the transmissive conductive electrodes 244 are overlay on the data lines 230, the difference of the parasitic capacitances $C_{pd}'$ and $C_{pd}$ are generally determined by the areas that the transmissive conductive electrodes 244 overlaying on the data lines 230. However, although the photo masks are preferably designed to have areas of the transmissive conductive electrodes 244 respectively the left side and the right side overlaying on the data lines 230 substantially equal to each other, in fact, practical exposing equipments are often hard to collimate sophistically enough to avoid an overlay shift between layers, especially when fabricating large size panels. Too much overlay shift between the transmissive conductive electrodes 244 and the data lines 230 causes too much difference between the absolute values of the parasitic capacitances $C_{pd}'$ and $C_{pd}$, and too much total parasitic capacitance, thus lowering the display quantity of the pixels.

SUMMARY OF THE INVENTION

Accordingly, the invention is to provide an active matrix and a simple driving method which drives single data line corresponding to single color at the active matrix substrate, whose sub-pixels are distributed in delta arrangement. Also, the invention can reduce cross-talk issue result from overlay shift between pixels and data lines.

As embodied and broadly described herein, the invention provides an active matrix substrate. The active matrix substrate includes a substrate, a plurality of scan lines, a plurality of data lines and a plurality of sub-pixels. The scan lines and the data lines are disposed on the substrate, and define a plurality of sub-pixel regions, wherein at least three of the adjacent sub-pixel regions distributed in a delta arrangement form a pixel region so that a plurality of pixel regions are formed. Each data line extends along edge of the sub-pixel regions and has multiple turnings corresponding to the corner of the pixel electrodes. According to the invention, the turnings of odd data lines are symmetric or mirror symmetric with those of the even data lines, wherein each data line controls sub-pixels for displaying a single color. The sub-pixels are disposed on the sub-pixel regions of the substrate correspondingly. The sub-pixels are electrically connected with corresponding scan lines and corresponding data lines. Between two sub-pixel regions corresponding to any two adjacent sub-pixels at a same side of one scan line, there are two data lines. Voltage differences between voltages respectively outputted by the two data lines and the common lines are opposite (one voltage difference is positive and the other voltage difference is negative), when a dot inversion driving method or a column inversion driving method is employed for driving the LCD panel. Each sub-pixel includes an active device and a pixel electrode. The active device is electrically connected with one corresponding scan line and one corresponding data line. The pixel electrode is electrically connected with the active device, and extends from the sub-pixel region corresponding to the sub-pixel to a position over the data line. The distance between pixel electrodes of any two adjacent sub-pixels, which are located at a same side of one scan line and electrically connected with the scan line, is shorter than the minimum distance between the adjacent data lines.

As embodied and broadly described herein, the invention further provides another active matrix substrate. The active matrix substrate includes a substrate, a plurality of scan lines, a plurality of data lines and a plurality of sub-pixels. The scan lines and the data lines are disposed on the substrate, and define a plurality of sub-pixel regions, wherein at least three of the adjacent sub-pixel regions distributed in a delta arrangement form a pixel region so that a plurality of pixel regions are formed. The sub-pixels are disposed on the sub-pixel regions of the substrate correspondingly. The sub-pixels are electrically connected with corresponding scan lines and data lines. Between two sub-pixel regions corresponding to any two adjacent sub-pixels at same side of one scan line, there are two data lines. Each sub-pixel includes an active device and a pixel electrode. The active device is electrically connected with one corresponding scan line and one corresponding data line. The pixel electrode is electrically connected with a corresponding active device.

According an embodiment of the invention, the pixel electrodes may be configured in a form of honeycomb.

According an embodiment of the invention, the pixel electrodes may be configured in a form of rectangular.

According an embodiment of the invention, each pixel electrode has a reference line and two electrode portions respectively distributed at two sides of the reference line, the two electrode portions being connected to each other and being symmetric to each other along the reference line.

According an embodiment of the invention, the electrode portions may be configured in a form of trapezium.

According an embodiment of the invention, the electrode portions may be configured in a form of parallelogram.

According an embodiment of the invention, the active matrix substrate may further includes a dielectric layer having a relatively low dielectric constant, less than 7, disposed on the substrate and between the pixel electrodes and the data lines.

In summary, according to the active matrix substrate of the invention, when any adjacent three sub-pixels electrically connected with one of the scan lines are arranged in a delta arrangement, LCD panels employing such active matrix substrates can achieve better display performance. Furthermore, with respect of the overlay shift caused by the exposing equipment when collimating, the overlay shift can be counted in when designing photo masks. After overlay shift occurring, the overlay areas of the pixel electrodes and the data lines also remain if the distance between two adjacent pixel electrodes is shorter than that between two adjacent data lines. Therefore, when LCD panels employing such active matrix substrates is driven by a dot inversion driving method or a column inversion driving method, the total parasitic capacitance can be reduced to minimum.

BRIEF DESCRIPTION OF THE DRAWING

The features of the invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DESCRIPTION OF THE EMBODIMENTS

The First Embodiment

Figure 1A:
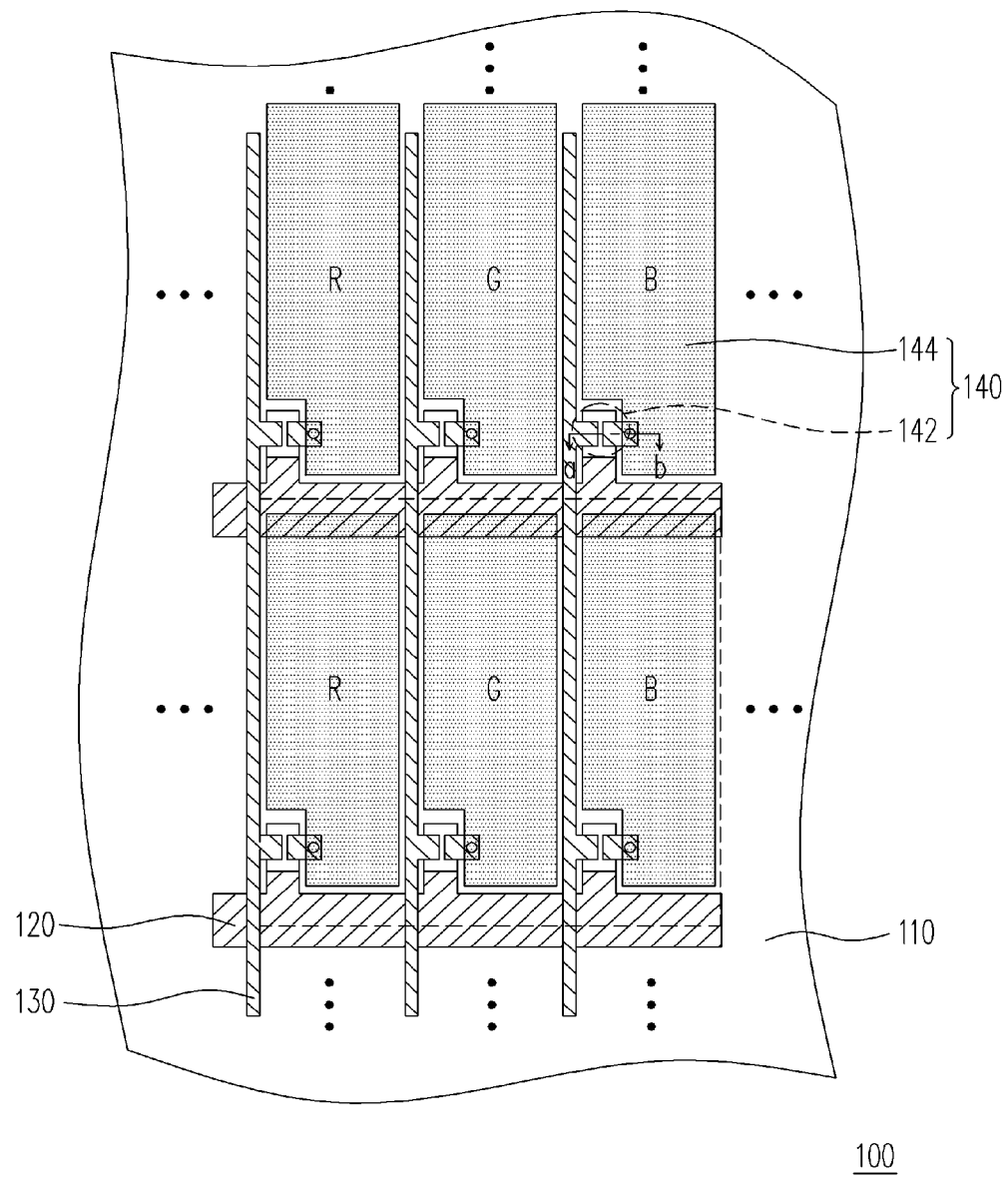
FIG. 1A is a top view of a conventional thin film transistor (TFT) array substrate.
Figure 1B:
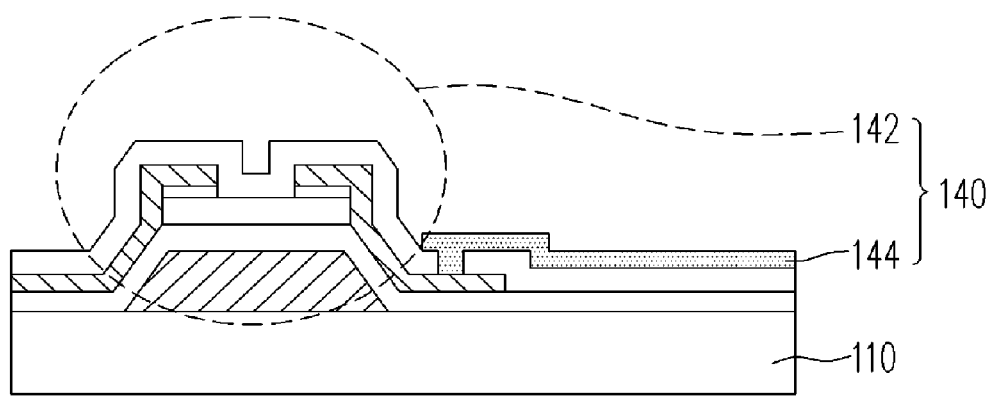
FIG. 1B is a schematic cross-sectional view along line a-b of the TFT array substrate shown in FIG. 1A.
Figure 2A:
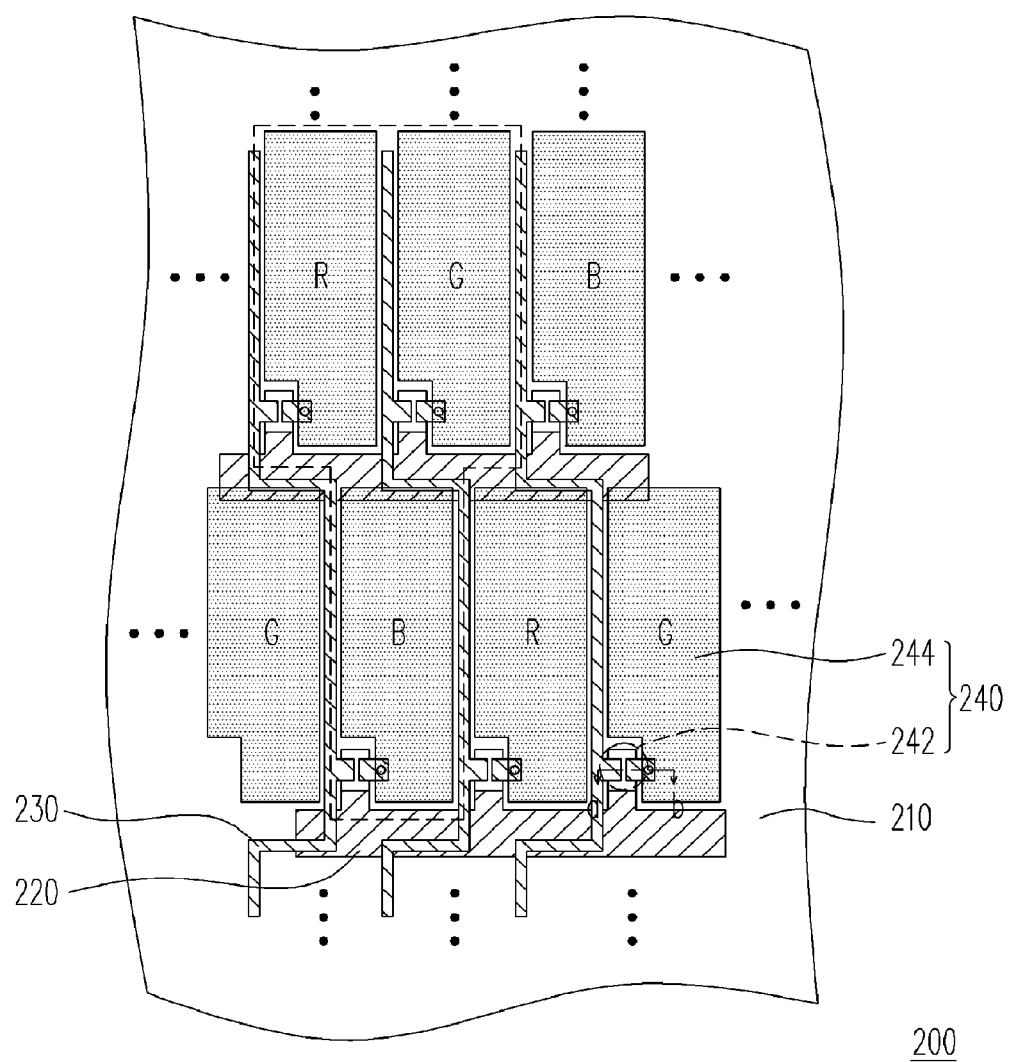
FIG. 2A is a top view of another conventional thin film transistor (TFT) array substrate.
Figure 2B:
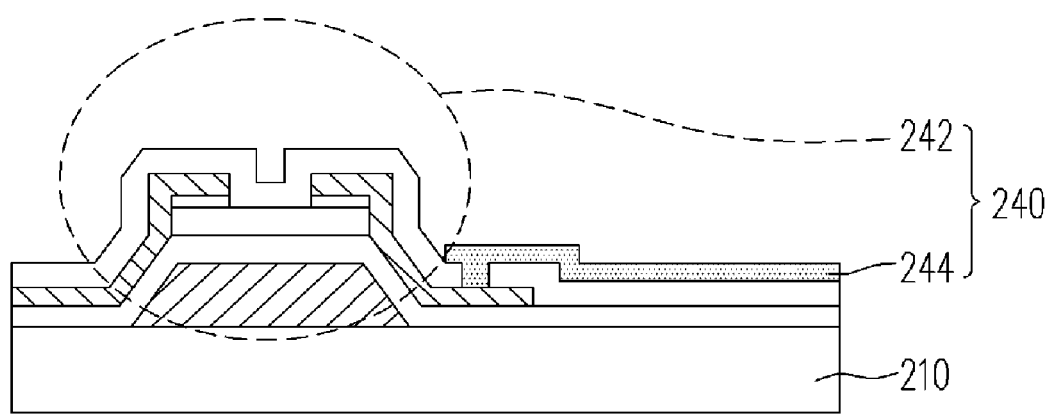
FIG. 2B is a schematic cross-sectional view along line a-b of the TFT array substrate shown in FIG. 2A.
Figure 2C:
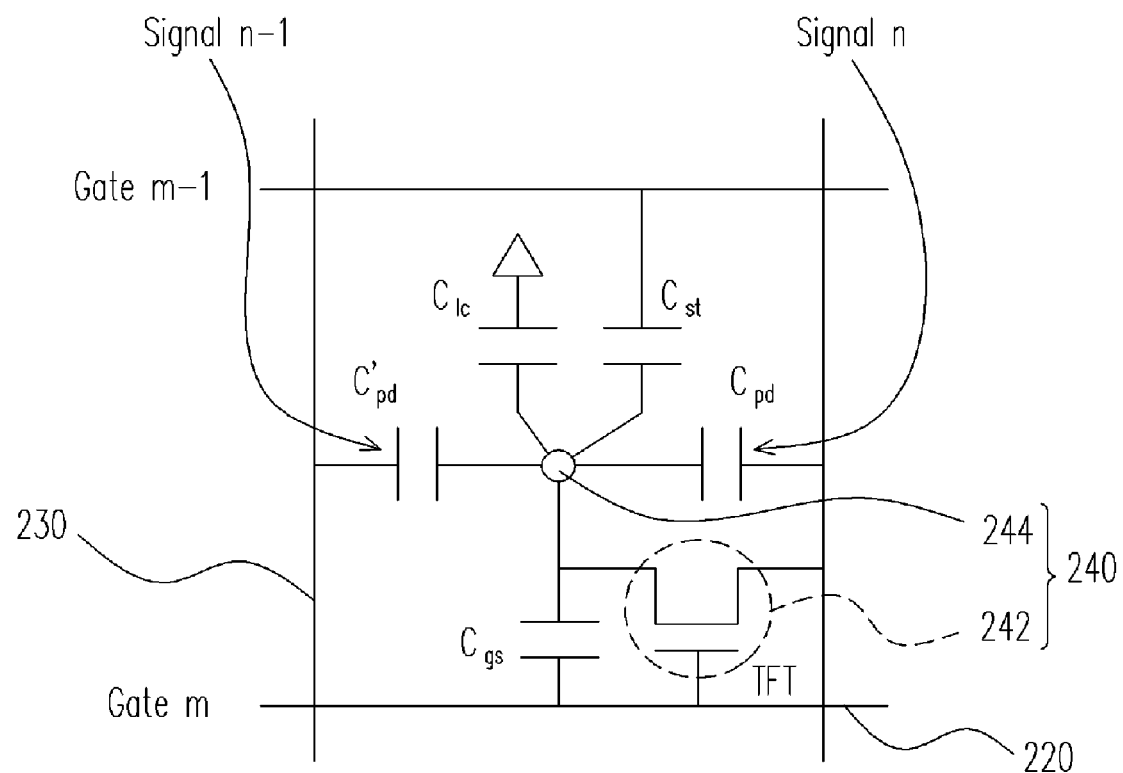
FIG. 2C schematically illustrates the capacitance effect of a single sub-pixel of FIG. 2A.
Figure 3A:
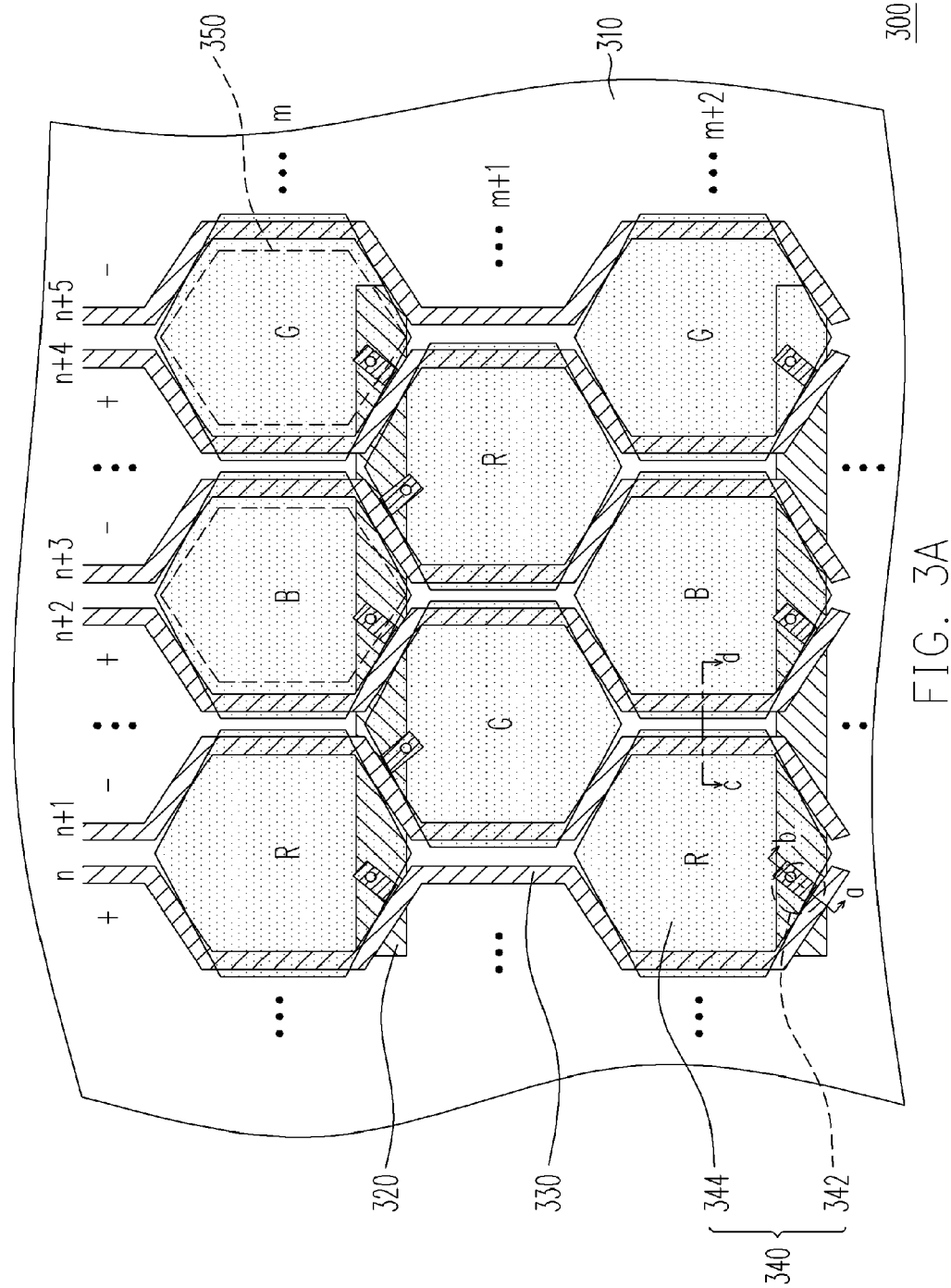
FIG. 3A is a top view of an active matrix substrate according to the first embodiment of the present invention.
Figure 3B:
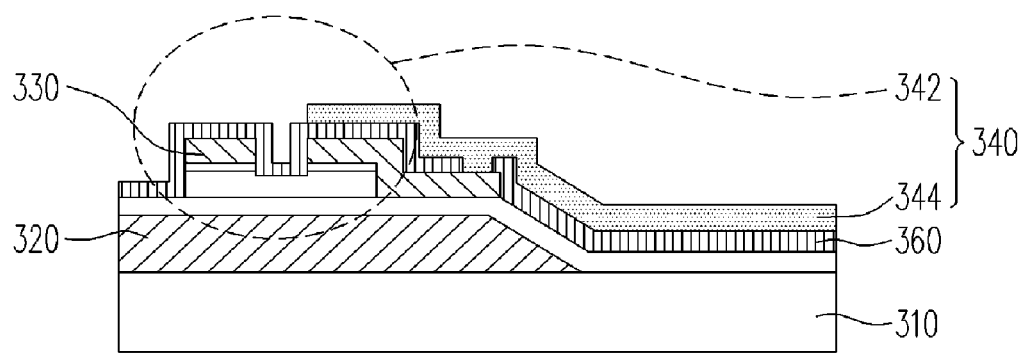
FIGS. 3B and 3C are schematic cross-sectional views along line a-b and line c-d of the active matrix substrate respectively shown in FIG. 3A.
Figure 3C:
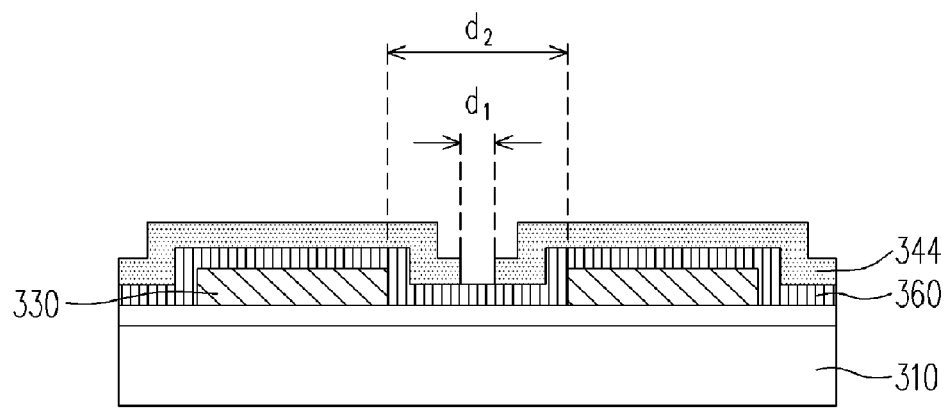

FIG. 3A is a top view of an active matrix substrate according to the first embodiment of the present invention, and FIGS. 3B and 3C are schematic cross-sectional views along line a-b and line c-d of the active matrix substrate respectively shown in FIG. 3A. Referring to FIGS. 3A through 3C, the active matrix substrate 300 of the present embodiment includes a substrate 310, a plurality of scan lines 320, a plurality of data lines 330 and a plurality of sub-pixels 340. Details of the substrate 310, the scan lines 320, the data lines 330 and the sub-pixels 340 are illustrated below.

The substrate 310 may be made of glass, quartz or other appropriate materials. The scan lines 320 may be made of aluminum alloy or other appropriate materials. The data lines 330 may be made of chromium alloy, aluminum alloy or other appropriate materials. The scan lines 320 and the data lines 330 are disposed on the substrate 310, and define a plurality of sub-pixel regions 350 distributed in a delta arrangement thereon. It is noted that, at least three of the adjacent sub-pixel regions 350 distributed in a delta arrangement form a pixel region so that a plurality of pixel regions are formed. The sub-pixels 340 are respectively corresponding to the sub-pixel regions 350 and disposed on the substrate 310. The sub-pixels 340 are electrically connected with corresponding scan lines 320 and corresponding data lines 330. In the active matrix substrate 300, there are two data lines 330 disposed between any two adjacent sub-pixels 340 at a same side of one scan line 320.

As shown in FIG. 3A, each sub-pixel 340 includes an active device 342 and a pixel electrode 344. The active device 342 is electrically connected with a corresponding scan line 320 and a corresponding data line 330. The active device 342 may be a thin film transistor (TFT), or other tri-polar switching devices. The pixel electrode 344 is electrically connected with the active device 342. The pixel electrode 344 may be a transmissive electrode, a reflective electrode or a transflective electrode. The pixel electrode 344 may be made of indium tin oxide (ITO), indium zinc oxide (IZO), metal or other appropriate transmissive or opaque conductive materials. The pixel electrode 344 extends from the sub-pixel region 350 corresponding to the sub-pixel 340 to a position over the data line 330. As shown in FIG. 3C, the distance between two adjacent pixel electrodes 344 disposed at a same side of one scan line 320 is $d_1$ and the two pixel electrodes 344 are electrically connected with the scan line 320 via the corresponding active device 342, respectively. Additionally, the distance $d_1$ is shorter than a minimum distance $d_2$ between two adjacent data lines 330. In other words, there are two data lines 330 proximate to the pixel electrode 344, respectively disposed at both sides of the pixel electrode 344. The pixel electrode 344 partially overlays on the two data lines 330 which are proximate to the pixel electrode 344. Such an active matrix substrate 300 is adapted for having the areas of both sides of the pixel electrode 344 overlaying the data lines 330 substantially equal to each other.

According to an aspect of the first embodiment of the invention, sub-pixels 340 of a same odd row are electrically connected with the odd data lines 330, and sub-pixels 340 of a same even row are electrically connected with the even data lines 330. The $n^{th}$ through the $(n+5)^{th}$ data lines 330 of the active matrix substrate 300, and the $m^{th}$ row through the $(m+2)^{th}$ row of sub-pixels 340 of the active matrix substrate 300 are shown as an example in FIG. 3A. The $m^{th}$ row and the $(m+2)^{th}$ row of sub-pixels 340 are respectively electrically connected with the $n^{th}$, the $(n+2)^{th}$ and the $(n+4)^{th}$ data lines 330. The $(m+1)^{th}$ row of sub-pixels 340 are electrically connected with the $(n+1)^{th}$ and the $(n+3)^{th}$ data lines 330. According to another aspect of the first embodiment, sub-pixels 340 of a same odd row are electrically connected with the even data lines 330, and sub-pixels 340 of a same even row are electrically connected with the odd data lines 330. The layout of the sub-pixel 340 and data lines 330 is for illustration purpose and should not be construed as a limitation of the present invention. The advantages of the active matrix substrate 300 are to be illustrated in details below.

Since the sub-pixels 340 are disposed on the substrate 310, corresponding to the sub-pixel regions 350 which are distributed in the delta arrangement on the substrate 310, the sub-pixels 340 are also distributed in a delta arrangement on the active matrix substrate 300. After the active matrix substrate 300 is assembled with a color filter substrate (not shown) and an LCD panel (not shown) is configured by filling a liquid crystal therein, in the active matrix substrate 300, any three adjacent sub-pixels 340 which are electrically connected to one of the scan lines 320 are arranged in a delta arrangement and correspond to color filtering films for different colors of the color filter substrate, such as red color R, green color G and blue color B. When displaying with an LCD panel using such an active matrix substrate 300, the transmitted light from corresponding color filtering films for red color R, green color G and blue color B can be mixed uniformly and efficiently, thus the LCD panel using such an active matrix substrate 300 has better display performance.

According to the first embodiment, the pixel electrodes 344 may be configured in a form of honeycomb. Each data line 330 has multiple turnings corresponding to the corner of the honeycomb sub-pixel regions 350. Each of the two sides of the pixel electrode 344 respectively partially overly with a data line 330 is proximate to the pixel electrode 344. Therefore, parasitic capacitances $C_{pd}$ are generated between each of the sub-pixels 340 and the data lines of its both sides. The areas of the pixel electrodes 344 overlaying on data lines 330 of both sides are substantially equal to each other, thus the parasitic capacitance $C_{pd}$ between each pixel electrode 344 and data lines 330 at both sides thereof can be cancelled out.

Specifically, a novel delta arrangement of sub-pixels 340 is provided in the first embodiment of the invention by employing the symmetric data lines 330 having turnings. According to the novel delta arrangement of sub-pixels 340, there are data lines 330 for transmitting different signals disposed between two adjacent sub-pixels 340 which are disposed at the same side of one scan line 320. The pixel electrodes 344 of the adjacent two sub-pixels 340 respectively overlay a corresponding data line 330. With respect to the overlay shift caused by the exposing equipment when collimating, the overlay shift can be counted in when designing photo masks. After overlay shift occurring, the overlay areas of the pixel electrodes 344 and the data lines 330 can be keep constant. Referring to FIG. 3C, specifically, the areas respectively of the pixel electrodes 344 overlaying on the data lines 330 are unchanged so as to maintain the parasitic capacitances of respectively left side and right side comparable and not changed by the overlay shift during the process. It is noted that, in order to reduce the parasitic capacitance $C_{pd}$, the active matrix substrate 300 further includes a dielectric layer 360 having a relatively low dielectric constant for lowering the value of the parasitic capacitance. The dielectric constant of the dielectric layer 360 may be smaller than 7. When LCD panel employing the active matrix substrate 300 is driven by a dot inversion driving method or a column inversion driving method, various voltages higher than that of the common lines are applied to data lines 320 of odd columns, and various voltages lower than that of the common lines are applied to data lines 320 of even columns, the parasitic capacitance effect of both sides of the sub-pixel 340 can be cancelled out, thus reducing cross talk.

It is to be noted that, although the embodiment of the invention illustrates the pixel electrodes 344 with a honeycomb-shaped electrode and illustrates the active matrix substrate 300 in accordance with an LCD panel, the pixel electrodes 344 are not limited to be honeycomb shaped electrodes, and the active matrix substrate 300 is not limited to be used in LCD panels. In other words, the pixel electrodes 344 according to the invention can be of other shapes/forms, and the active matrix substrate 300 can also be used in display panels other than LCD panels.

Figure 3D:
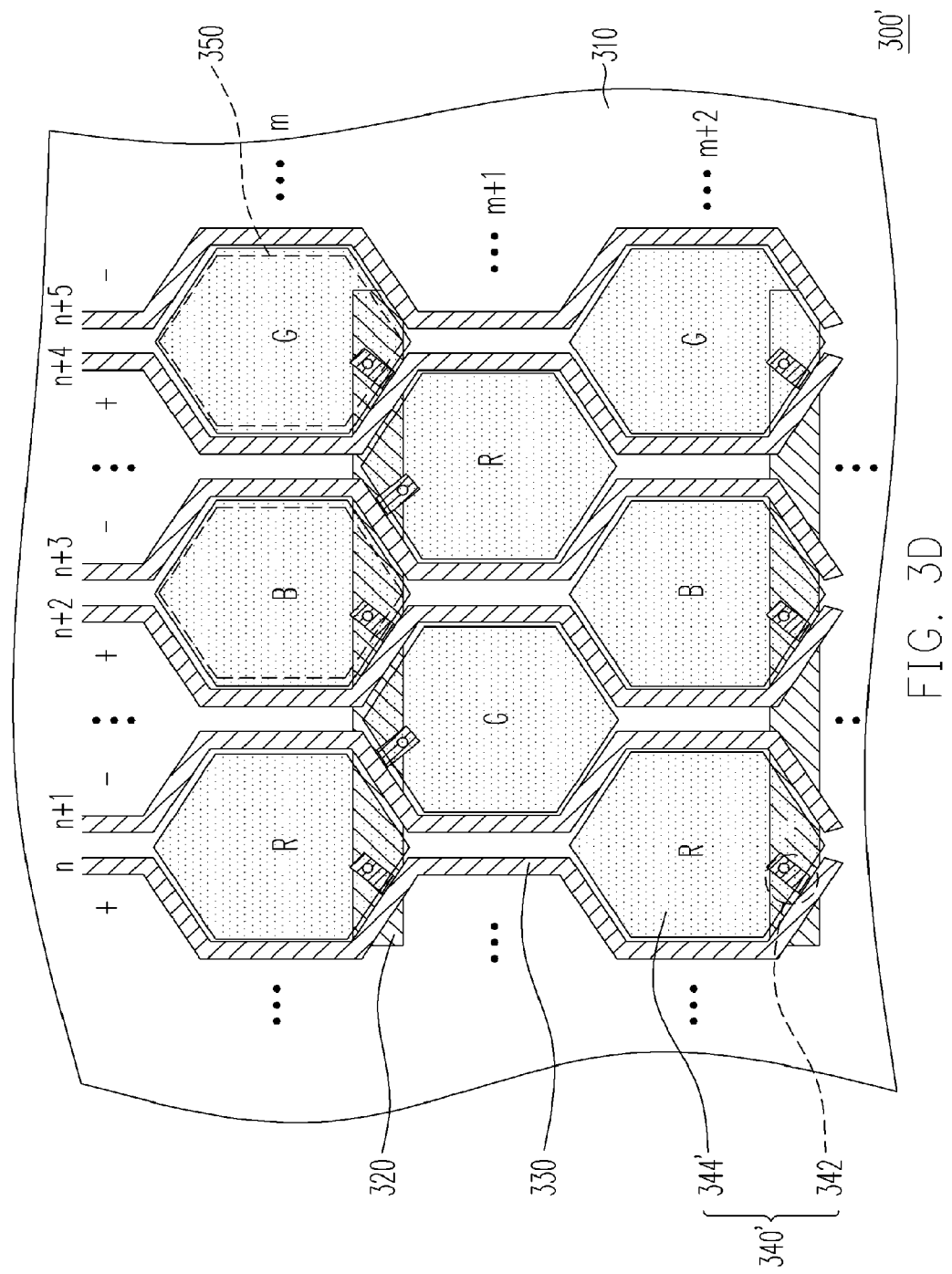
FIG. 3D is a top view of another active matrix substrate according to the first embodiment.
Figure 3E:
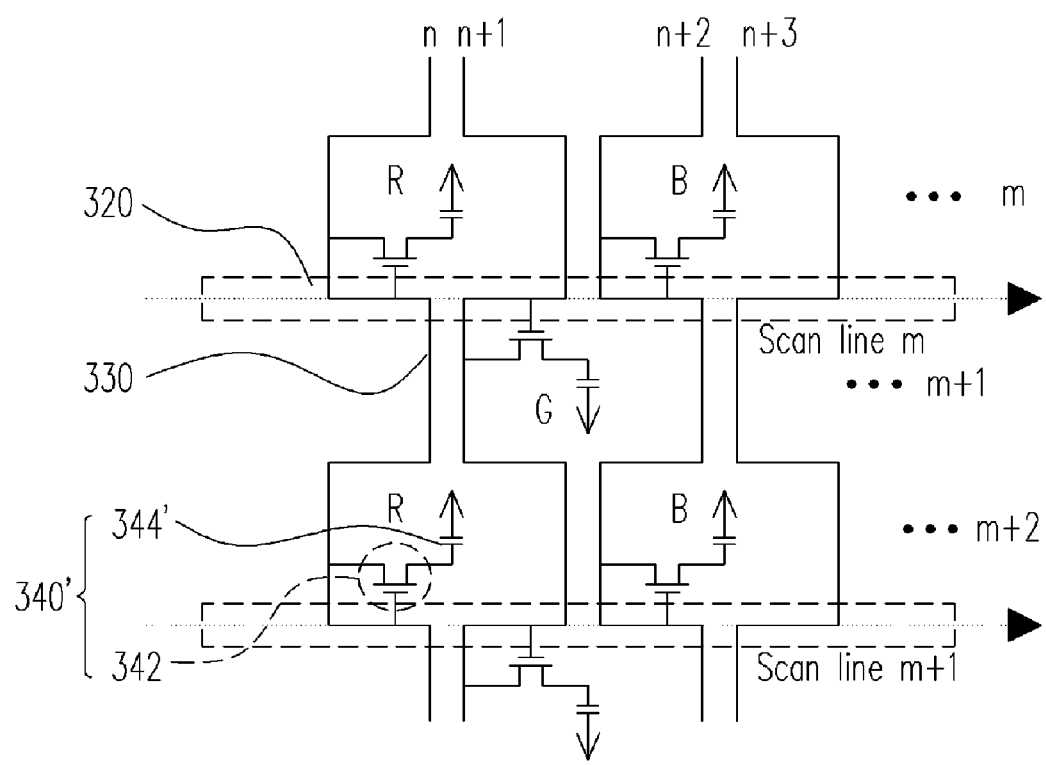
FIG. 3E is a schematic diagram for illustrating the driving circuit of the active matrix distributed in a delta arrangement, shown in FIG. 3D.

FIG. 3D is a top view of another active matrix substrate according to the first embodiment. Referring to FIG. 3D, the active matrix substrate 300' is similar to the foregoing active matrix substrate 300, and the difference therebetween is the active matrix substrate 300', the pixel electrodes 344 do not overlay on the data lines 330. FIG. 3E is a schematic diagram for illustrating the driving circuit of the active matrix distributed in a delta arrangement, shown in FIG. 3D. Referring to FIG. 3E, according to the active matrix substrate 300', a novel delta arrangement of sub-pixels 340' is provided in the present embodiment by employing the symmetric data lines 330 having turnings, which is corresponding to the corner of the pixel electrodes 344'. The delta arrangement of sub-pixels 340' is simple to drive because one of the data lines 330 can control sub-pixels 340' to display a single color.

The Second Embodiment

Figure 4A:
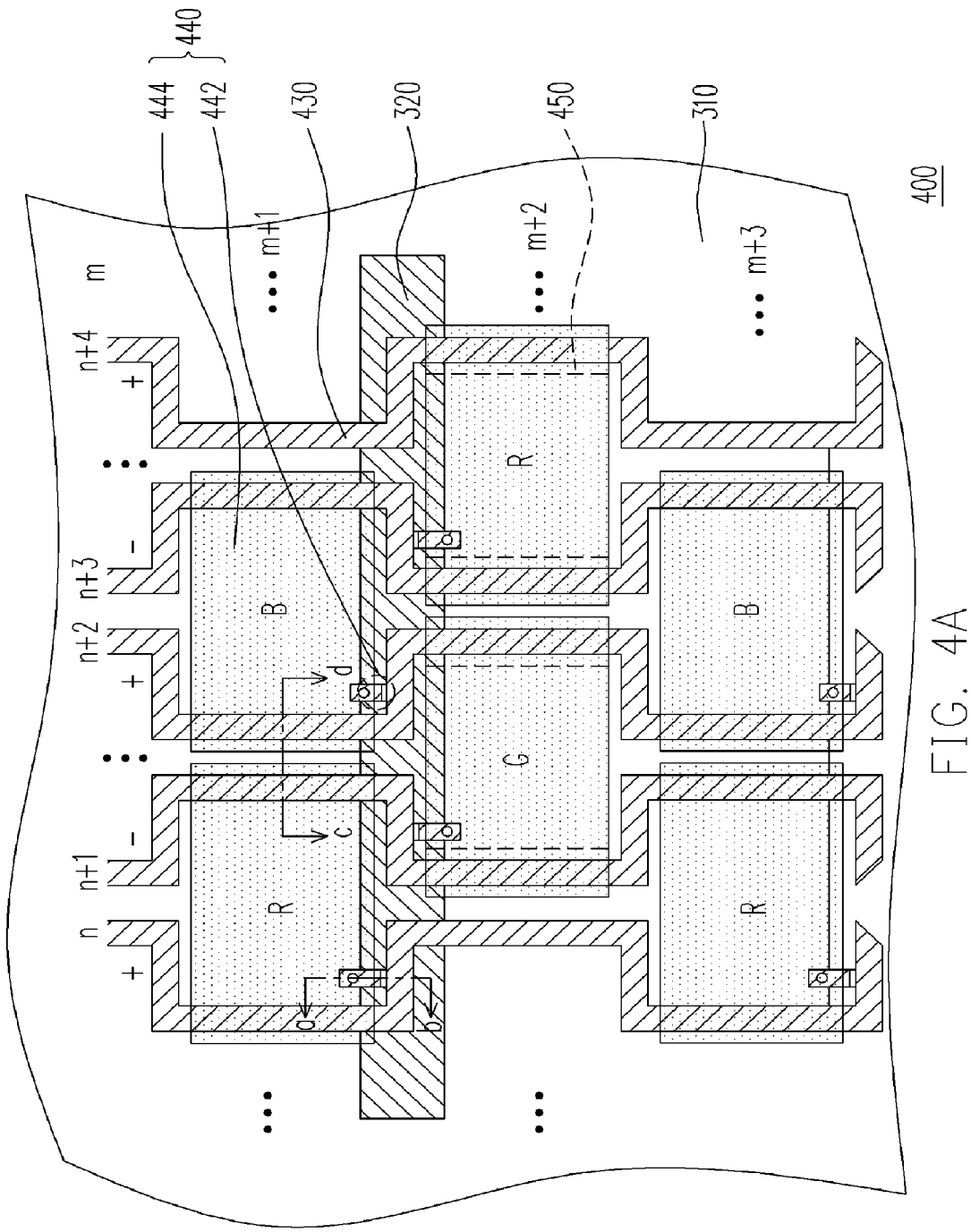
FIG. 4A is a top view of an active matrix substrate according to the second embodiment of the present invention.
Figure 4B:
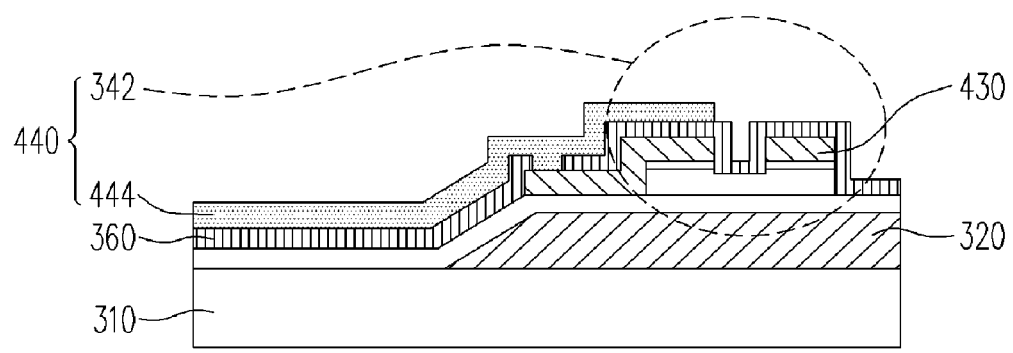
FIGS. 4B and 4C are schematic cross-sectional views along line a-b and line c-d of the active matrix substrate respectively shown in FIG. 4A.
Figure 4C:
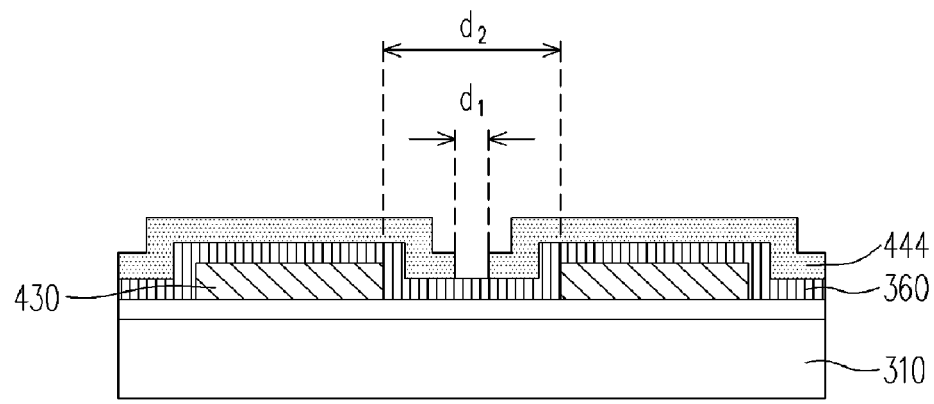

FIG. 4A is a top view of an active matrix substrate according to the second embodiment of the present invention. FIGS. 4B and 4C are schematic cross-sectional views along line a-b and line c-d of the active matrix substrate respectively shown in FIG. 4A. Referring to FIGS. 4A through 4C, the active matrix substrate 400 is similar to the active matrix substrate 300 of the first embodiment, and the difference therebetween is that the pixel electrodes 444 of the second embodiment of the invention are configured in a form of rectangular and each of the data lines 430 has multiple turnings incorporating with the shape of the corresponding pixel electrode 444, whereby defining a sub-pixel region 450.

The advantages of the active matrix substrate 400 according to the second embodiment of the invention are similar with the active matrix substrate 300 according to the first embodiment of the invention, and are not to be repeated.

Furthermore, it is to be noted that the pixel electrodes 444 of the active matrix substrate 400 can be modified to not overlay the data lines 430, by which another active matrix substrate (not shown) within the scope of the invention can be configured. In such an active matrix substrate 400, one of the data lines 430 can control sub-pixels 440 to display a single color.

The Third Embodiment

Figure 5A:
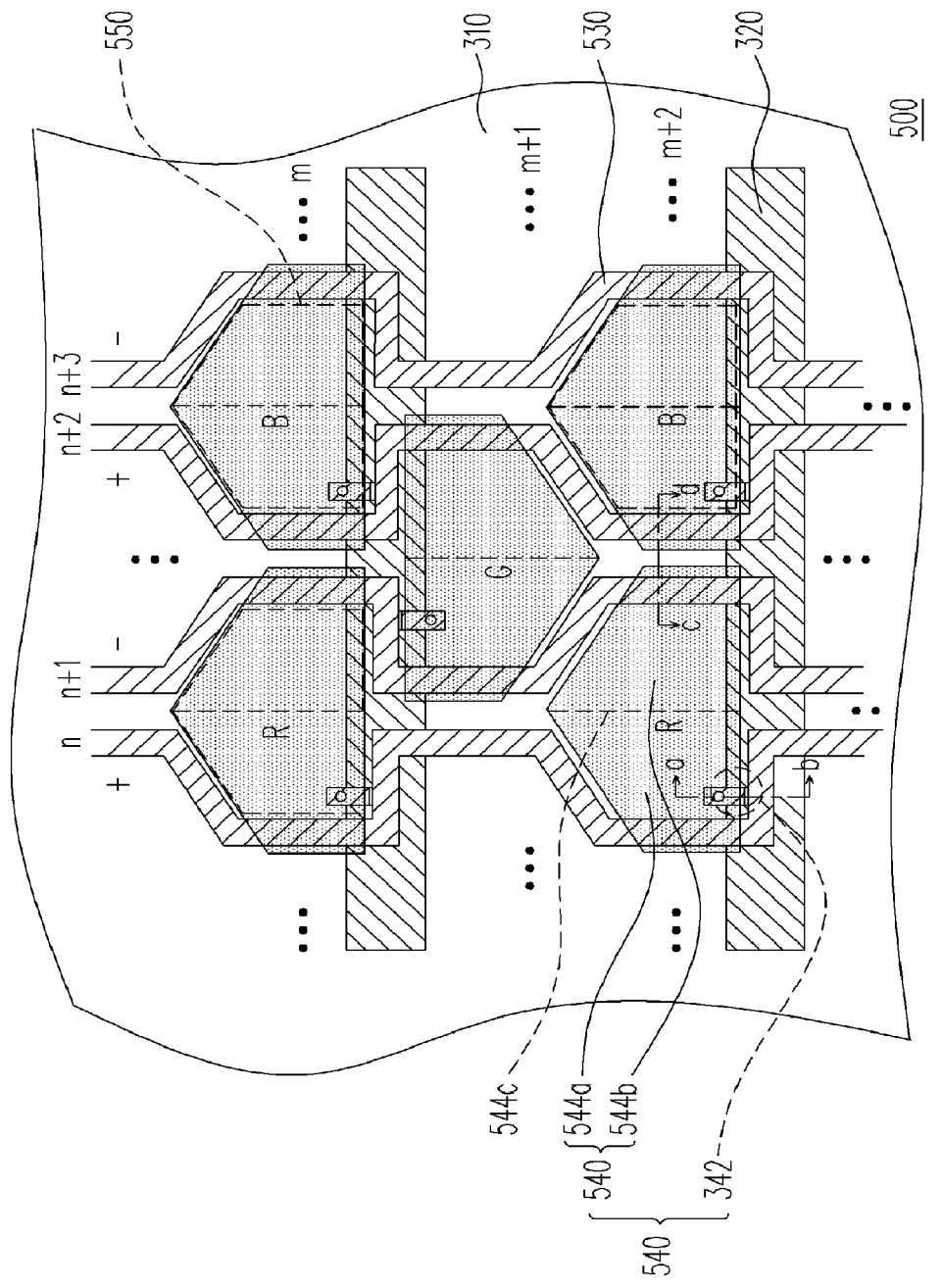
FIG. 5A is a top view of an active matrix substrate according to the third embodiment of the present invention.
Figure 5B:
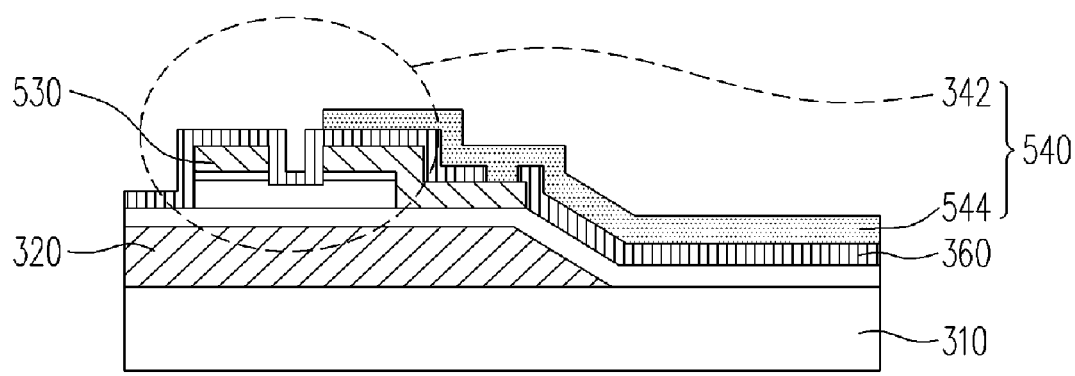
FIGS. 5B and 5C are schematic cross-sectional views along line a-b and line c-d of the active matrix substrate respectively shown in FIG. 5A.
Figure 5C:
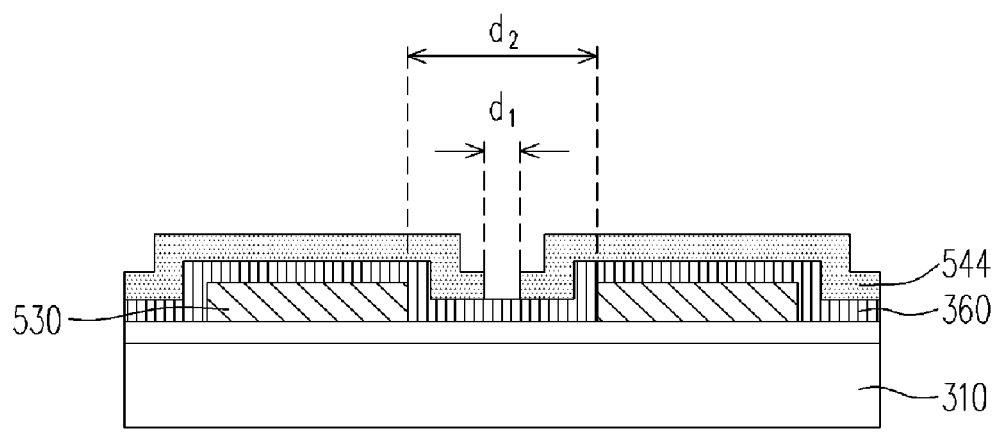

FIG. 5A is a top view of an active matrix substrate according to the third embodiment of the present invention. FIGS. 5B and 5C are schematic cross-sectional views along line a-b and line c-d of the active matrix substrate respectively shown in FIG. 5A. Referring to FIGS. 5A through 5C, the active matrix substrate 500 is similar to the active matrix substrate 300 of the first embodiment, and the difference therebetween is that according to the third embodiment of the invention, a reference line 544c is defined in each of the pixel electrodes 544, the reference line 544c dividing the pixel electrode 544 into two electrode portions 544a and 544b which are symmetric along the reference line 544c and electrically connected to each other. The two electrode portions 544a and 544b are configured in a form of trapezium. The data line 530 has multiple turnings for incorporating the form of the pixel electrode 544 and therefore defines a shield shaped sub-pixel region 550.

The advantages of the active matrix substrate 500 according to the third embodiment of the invention are similar to the active matrix substrate 300 according to the first embodiment of the invention, and are not to be repeated. Furthermore, it is to be noted that the pixel electrodes 544 of the active matrix substrate 500 can be modified to not overlay the data lines 530, by which another active matrix substrate (not shown) within the scope of the invention can be configured. In such an active matrix substrate 500, one of the data lines 530 can control sub-pixels 540 to display a single color.

It is to be noted that the two electrodes 544a and 544b of the pixel electrode 544 according to the third embodiment are not limited to be trapezium-shaped. They may be of other shapes according to the application.

The Fourth Embodiment

Figure 6A:
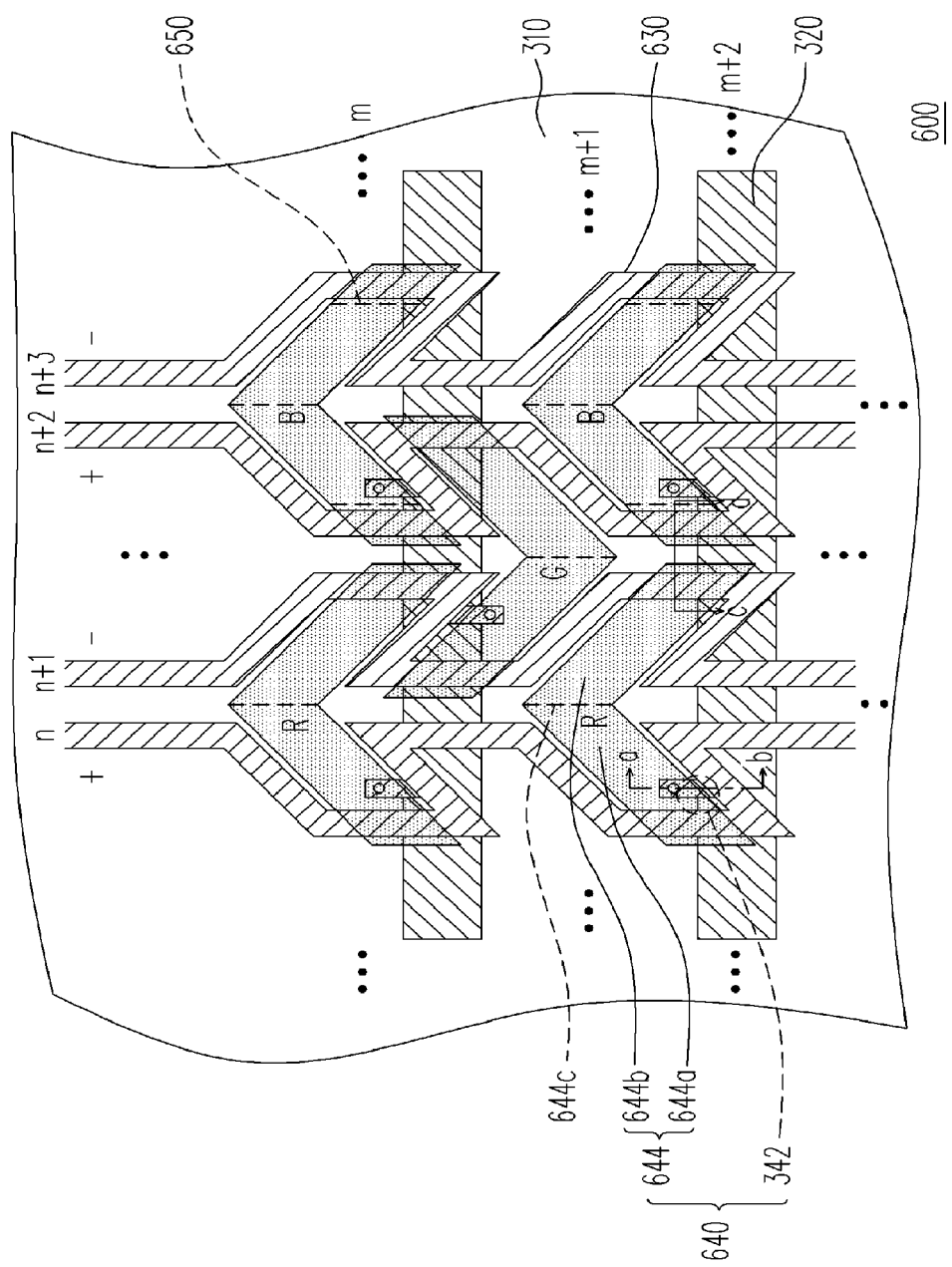
FIG. 6A is a top view of an active matrix substrate according to the fourth embodiment of the present invention.
Figure 6B:
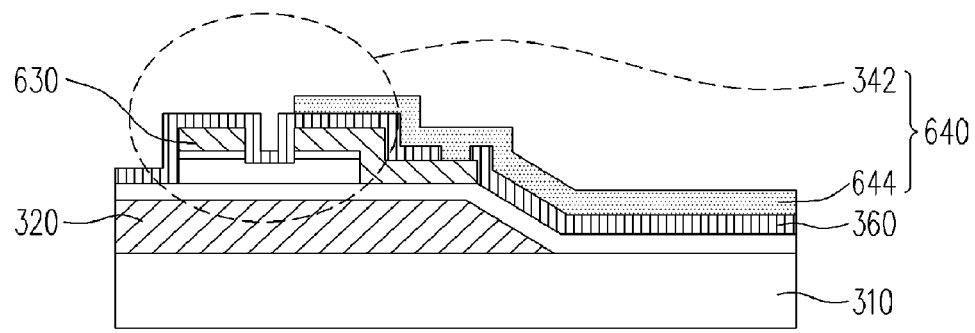
FIGS. 6B and 6C are schematic cross-sectional views along line a-b and line c-d of the active matrix substrate respectively shown in FIG. 6A.
Figure 6C:
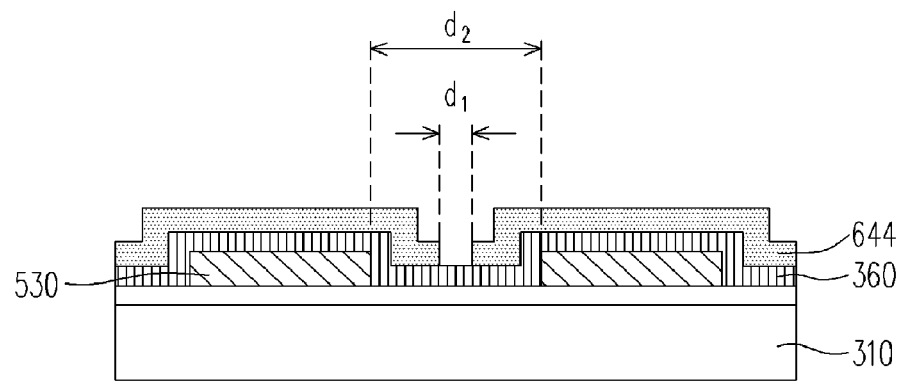

FIG. 6A is a top view of an active matrix substrate according to the fourth embodiment of the present invention. FIGS. 6B and 6C are schematic cross-sectional views along line a-b and line c-d of the active matrix substrate respectively shown in FIG. 6A. Referring to FIGS. 6A through 6C, the active matrix substrate 600 is similar to the active matrix substrate 500 of the third embodiment, and the difference therebetween is that the pixel electrode 644 according to the fourth embodiment of the invention has two electrode portions 644a and 644b defined by employing a reference line 644c, wherein the two electrode portions 644a and 644b are configured in a form of parallelogram and are symmetric along the reference line 644c. The data line 630 has multiple turnings for incorporating the form of the pixel electrode 644 and therefore defines a boomerang-shaped sub-pixel region 650.

The advantages of the active matrix substrate 600 according to the second embodiment of the invention are similar to the active matrix substrate 300 according to the first embodiment of the invention, and are not to be repeated.

Furthermore, it is noted that, the pixel electrodes 644 of the active matrix substrate 600 can be modified to not overlay the data lines 630, by which another active matrix substrate (not shown) within the scope of the invention can be configured. In such active matrix substrate 600, one of the data lines 630 can control sub-pixels 640 to display a single color.

In summary, the active matrix substrate according to the present invention has at least the following advantages:

1. The active matrix substrate according to the present invention has areas of the left side and the right side respectively overlaying corresponding data lines substantially equal to each other. Therefore, the overlay shift during the fabricating process of the data line and the transmissive conductive layer would not change the overlaying areas, thus the active matrix substrate according to the present invention has a relatively wide process window of the overlay shift between the pixel electrodes and the data lines.

2. According to the active matrix substrate of the invention, both the left side and the right side of the pixel electrode partially overlay the data lines, thus increasing the aperture ratio of the LCD panel using the active matrix substrate according to the present invention.

3. According to the active matrix substrate of the invention, any three adjacent sub-pixels which are electrically connected to a single scan line are arranged in a delta arrangement, thus the LCD panel using the active matrix substrate can achieve better display performance.

4. The active matrix substrate may further include a dielectric layer having a relatively low dielectric constant. Such a dielectric layer can be made of inorganic materials, organic materials or color filtering films, having a dielectric constant smaller than 7. The dielectric layer is disposed between the pixel electrodes and the data lines for reducing the parasitic capacitance generated therebetween and preventing the charges stored in the transmissive electrodes from being affected by the signal transmission of the data lines.

5. According to the active matrix substrate of the invention, under the condition of the transmissive conductive electrodes overlaying the data lines, the absolute values of the parasitic capacitances between the data lines and respectively the left side and the right side of each pixel electrode can be controlled to be substantially equal to each other. Therefore, when LCD panels employing the active matrix are driven by a dot inversion method or a column inversion method, the total parasitic capacitance of each sub-pixel can be reduced to the minimum.

Other modifications and adaptations of the above-described preferred embodiments of the present invention may be made to meet particular requirements. This disclosure is intended to exemplify the invention without limiting its scope. All modifications that incorporate the invention disclosed in the preferred embodiment are to be construed as coming within the scope of the appended claims or the range of equivalents to which the claims are entitled.

What is claimed is:

1. An active matrix substrate, comprising:
   a substrate;
   a plurality of scan lines, disposed on the substrate;
   a plurality of data lines, disposed on the substrate, wherein the scan lines and the data lines define a plurality of sub-pixel regions, and at least three of the adjacent sub-pixel regions distributed in a delta arrangement form a pixel region so that a plurality of pixel regions are formed and one of the data lines is substantially placed along three edges of one of the sub-pixel regions;
   a plurality of sub-pixels, corresponding to the sub-pixel regions and disposed on the substrate, the sub-pixels being electrically connected with corresponding scan lines and corresponding data lines, wherein each of the sub-pixel regions is substantially bordered on all sides by two of the data lines except the outmost sub-pixel regions, each of the sub-pixels comprising:
      an active device, electrically connected with one corresponding scan line and one corresponding data line; and
      a pixel electrode, electrically connected with the active device, extending from the sub-pixel region corresponding to the sub-pixel to a position over the data line, wherein a distance between pixel electrodes of any two adjacent sub-pixels, which are located at a same side of one scan line and electrically connected with the scan line, is shorter than the minimum distance between the adjacent data lines.

2. The active matrix substrate according to claim 1, wherein the pixel electrodes are configured in a form of honeycomb.

3. The active matrix substrate according to claim 1, wherein the pixel electrodes are configured in a form of rectangular.

4. The active matrix substrate according to claim 1, wherein each of the pixel electrodes has a reference line and two electrode portions, the electrode portions being electrically connected to each other and symmetric to each other along the reference line.

5. The active matrix substrate according to claim 4, wherein the electrode portions are configured in a form of trapezium.

6. The active matrix substrate according to claim 4, wherein the electrode portions are configured in a form of parallelogram.

7. The active matrix substrate according to claim 1, further comprising:
   a dielectric layer having a dielectric constant smaller than 7, disposed on the substrate and between the pixel electrodes and the data lines.

8. The active matrix substrate according to claim 1, wherein the sub-pixels of a same odd row are electrically connected with the odd data lines, and sub-pixels of a same even row are electrically connected with the even data lines.

9. The active matrix substrate according to claim 1, wherein the sub-pixels of a same odd row are electrically connected with the even data lines, and sub-pixels of a same even row are electrically connected with the odd data lines.

10. The active matrix substrate according to claim 1, wherein the sub-pixels electrically connected with one of the data lines are adapted for displaying a single color.

11. An active matrix substrate, comprising:
    a substrate;
    a plurality of scan lines, disposed on the substrate;
    a plurality of data lines, disposed on the substrate, wherein the scan lines and the data lines define a plurality of sub-pixel regions, and at least three of the adjacent sub-pixel regions distributed in a delta arrangement form a pixel region so that a plurality of pixel regions are formed and one of the data lines is substantially placed along three edges of one of the sub-pixel regions; and
    a plurality of sub-pixels disposed on the substrate, corresponding to the sub-pixel regions, the sub-pixels being electrically connected with corresponding scan lines and corresponding data lines, wherein each of the sub-pixel regions is substantially bordered on all sides by two of the data lines except the outmost sub-pixel regions, each of the sub-pixels comprising:
       an active device, electrically connected with one corresponding scan line and one corresponding data line; and
       a pixel electrode, electrically connected with the active device.

12. The active matrix substrate according to claim 11, wherein the pixel electrodes are configured in a form of honeycomb.

13. The active matrix substrate according to claim 11, wherein the pixel electrodes are configured in a form of rectangular.

14. The active matrix substrate according to claim 11, wherein each of the pixel electrodes has a reference line and two electrode portions, the electrode portions being electrically connected to each other and symmetry to each other along the reference line.

15. The active matrix substrate according to claim 14, wherein the electrode portions are configured in a form of trapezium.

16. The active matrix substrate according to claim 14, wherein the electrode portions are configured in a form of parallelogram.

17. The active matrix substrate according to claim 11, wherein the sub-pixels electrically connected with one of the data lines are adapted for displaying a single color.

18. The active matrix substrate according to claim 1, wherein each of the scan lines has a straight portion, wherein the straight portion of one scan line is overlapped with the at least three of the adjacent sub-pixel regions distributed in a delta arrangement, wherein the straight portion of the one of the scan lines is substantially overlapped with both of the active device and the pixel electrode, and wherein the pixel electrode is substantially overlapped with both of the active device and the corresponding data line electrically connected with the active device.

19. The active matrix substrate according to claim 11, wherein each of the scan lines has a straight portion, wherein the straight portion of one scan line is overlapped with the at least three of the adjacent sub-pixel regions distributed in a delta arrangement, wherein the straight portion of the one of the scan lines is substantially overlapped with both of the active device and the pixel electrode, and wherein the pixel electrode is substantially overlapped with both of the active device and the corresponding data line electrically connected with the active device.

20. An active matrix substrate, comprising:
a substrate;
a plurality of scan lines each having a straight portion, disposed on the substrate;
a plurality of data lines, disposed on the substrate, wherein the scan lines and the data lines define a plurality of sub-pixel regions, and at least three of the adjacent sub-pixel regions distributed in a delta arrangement form a pixel region so that a plurality of pixel regions are formed;
a plurality of sub-pixels, corresponding to the sub-pixel regions and disposed on the substrate, the sub-pixels being electrically connected with corresponding scan lines and corresponding data lines, wherein each of the sub-pixel regions is substantially bordered on all sides by two of the data lines except the outmost sub-pixel regions, and wherein the straight portion of one scan line is overlapped with the at least three of the adjacent sub-pixel regions distributed in a delta arrangement, each of the sub-pixels comprising:
an active device, electrically connected with one corresponding scan line and one corresponding data line; and
a pixel electrode, electrically connected with the active device, extending from the sub-pixel region corresponding to the sub-pixel to a position over the data line, wherein a distance between pixel electrodes of any two adjacent sub-pixels, which are located at a same side of, one scan line and electrically connected with the scan line, is shorter than the minimum distance between the adjacent data lines, wherein the straight portion of the one of the scan lines is substantially overlapped with both of the active device and the pixel electrode, and wherein the pixel electrode is substantially overlapped with both of the active device and the corresponding data line electrically connected with the active device.

21. An active matrix substrate, comprising:
a substrate;
a plurality of scan lines, disposed on the substrate;
a plurality of data lines, disposed on the substrate, wherein the scan lines and the data lines define a plurality of sub-pixel regions, and at least three of the adjacent sub-pixel regions distributed in a delta arrangement form a pixel region so that a plurality of pixel regions are formed and one of the data lines is substantially placed along three edges of one of the sub-pixel regions;
a plurality of sub-pixels, corresponding to the sub-pixel regions and disposed on the substrate, the sub-pixels being electrically connected with corresponding scan lines and corresponding data lines, wherein the sub-pixel regions are not overlapped with the data lines, and each of the sub-pixel regions is substantially bordered on all sides by two of the data lines except the outmost sub-pixel regions, each of the sub-pixels comprising:
an active device, electrically connected with one corresponding scan line and one corresponding data line; and
a pixel electrode, electrically connected with the active device, extending from the sub-pixel region corresponding to the sub-pixel to a position over the data line, wherein a distance between pixel electrodes of any two adjacent sub-pixels, which are located at a same side of one scan line and electrically connected with the scan line, is shorter than the minimum distance between the adjacent data lines.

\* \* \* \* \*